Feb. 13, 1951 W. H. GIVENROD 2,541,867
CHEMICAL PHOSPHATE AND CHEMICAL FERTILIZER SOWER
Filed Jan. 13, 1948 2 Sheets-Sheet 1

INVENTOR.
WILBURN HOMER GIVENROD,
BY
McMorrow, Berman & Davidson
ATTORNEYS.

Feb. 13, 1951 W. H. GIVENROD 2,541,867
CHEMICAL PHOSPHATE AND CHEMICAL FERTILIZER SOWER
Filed Jan. 13, 1948 2 Sheets-Sheet 2

INVENTOR.
WILBURN HOMER GIVENROD,
BY
McMorrow, Berman & Davidson
ATTORNEYS.

Patented Feb. 13, 1951

2,541,867

UNITED STATES PATENT OFFICE 2,541,867

CHEMICAL PHOSPHATE AND CHEMICAL FERTILIZER SOWER

Wilburn Homer Givenrod, Belleville, Ill., assignor to AVCO Manufacturing Corporation, Cincinnati, Ohio, a corporation of Delaware Application January 13, 1948, Serial No. 2,107

2 Claims. (Cl. 275—2)

1

This invention relates to material spreading devices, and more particularly to a spreading machine for distributing chemical fertilizer and the like.

A main object of the invention is to provide a novel and improved fertilizer spreading device which is simple in construction, substantially positive in action and easy to regulate so as to provide a desired rate of feed.

A further object of the invention is to provide an improved fertilizer distributing device which is inexpensive to manufacture, sturdy in construction and which provides a constant feeding action not subject to clogging.

Further objects and advantages of the invention will become apparent from the following description and claims, and from the accompanying drawings, wherein:

Figure 1:
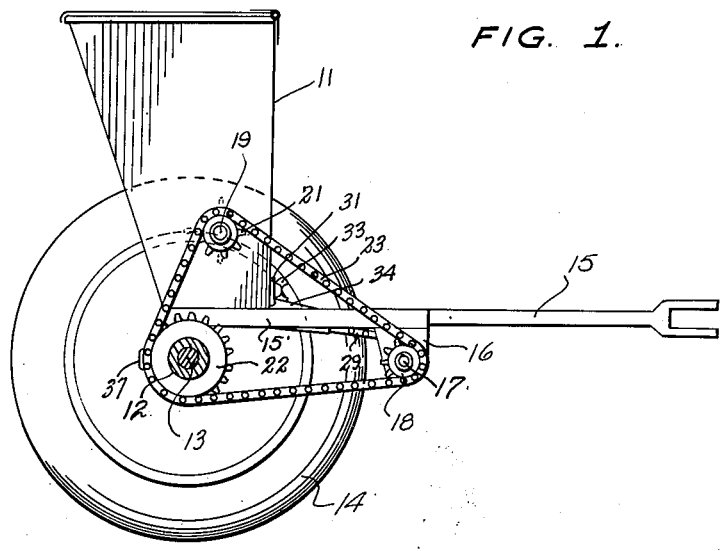
Figure 1 is a longitudinal cross-sectional view taken through a fertilizer spreading device constructed according to this invention and showing the main components thereof in side elevation, said view being taken on line 1—1 of Figure 2.
Figure 2:
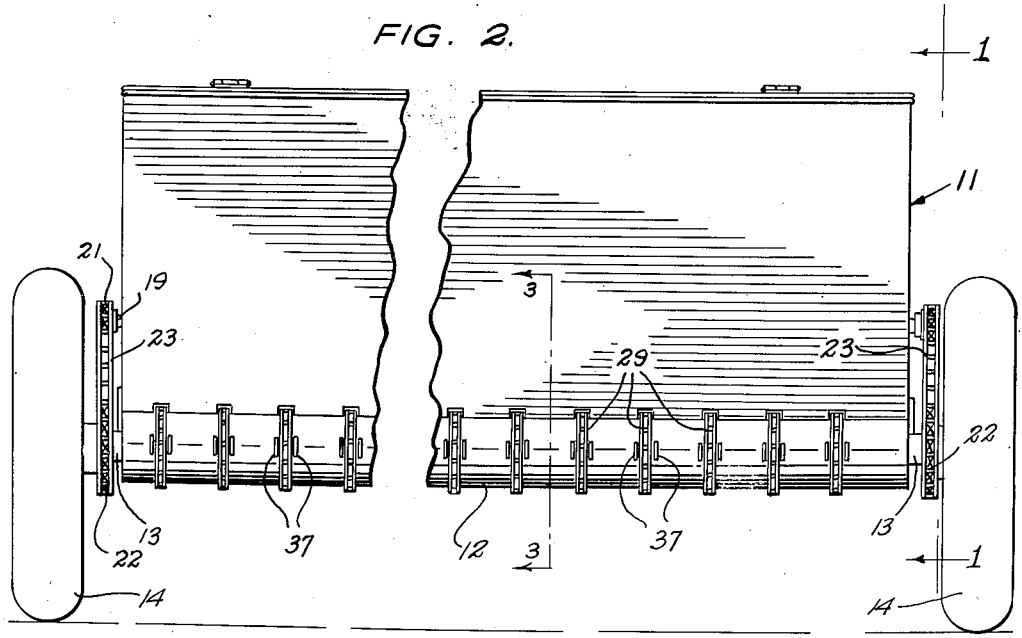
Figure 2 is a rear end elevational view of the fertilizer spreading device of Figure 1.

Referring to the drawings, 11 designates a fertilizer container or hopper to the bottom of which is rigidly secured, as by welding or the like, a cylindrical member 12. Projecting axially from the ends of member 12 and secured thereto are axle elements 13, 13 and rotatably mounted thereon are ground-engaging wheels 14, 14. Secured to the central lower portion of hopper 11 and extending forwardly in the longitudinal plane of the machine is a drawbar or tongue 15 adapted to be hitched to a suitable tractor means. Secured to the bottom portions of the side walls of hopper 11 are forwardly extending parallel arms 15' and adjustably secured to said arms for longitudinal adjustment thereon are depending bearing brackets 16. Transversely journaled in said bearing brackets are aligned shaft elements 17, 17', the inner ends of said shaft elements being rotatably supported in depending brackets 38, 38' secured to opposite sides of the drawbar 15. Secured to the outer ends of said shaft elements 17, 17' are sprocket wheels 18. Each of the sprocket wheels 18 is provided with a projecting hub 18' which surrounds the adjacent portion of the shaft 17 or

2

17' and is keyed to the latter by a pin 18". Journaled transversely in the lower portion of hopper 11 are aligned shaft elements 19, 19' provided with agitator teeth 20. The inner ends of shaft elements 19, 19' are rotatively supported on bracket members 39, 39' secured to the rear wall of hopper 11. The outer ends of shaft elements 19, 19' project through the side walls of hopper 11 and secured thereon are sprocket wheels 21. Secured to each wheel 14 is a sprocket wheel 22, which rotates in unison with the wheel on its corresponding axle element 13. The sprocket wheels 18, 21 and 22 at each side of the machine are coupled together by a sprocket chain 23, whereby shafts 19, 19' and 17, 17' are simultaneously rotated responsive to rotation of the ground-engaging wheels 14, 14 as the machine is moved.

Figure 3:
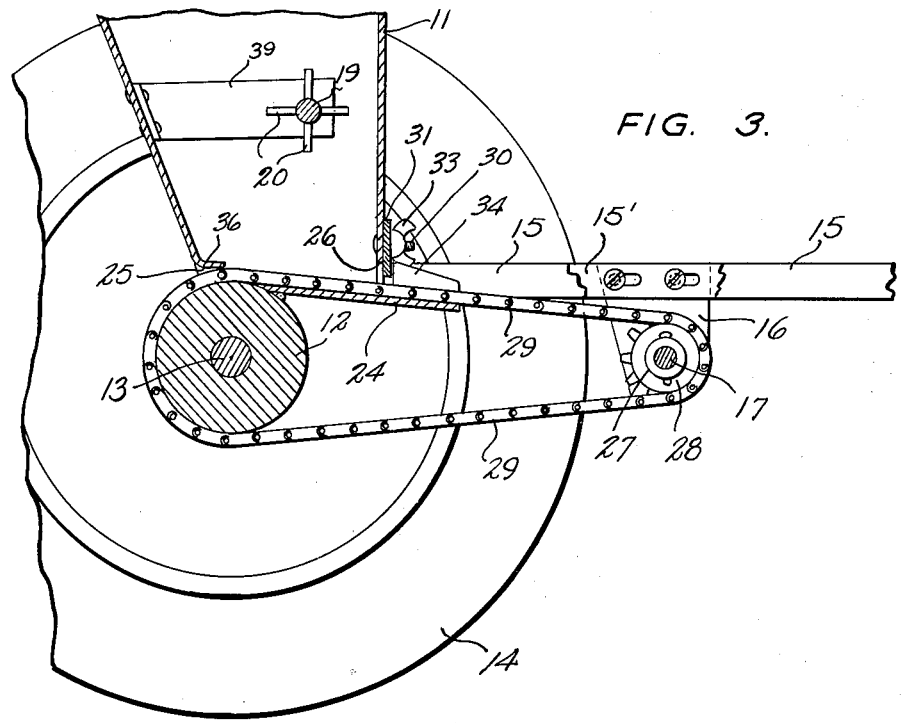
Figure 3 is an enlarged cross-sectional detail view taken on line 3—3 of Figure 2.
Figure 4:
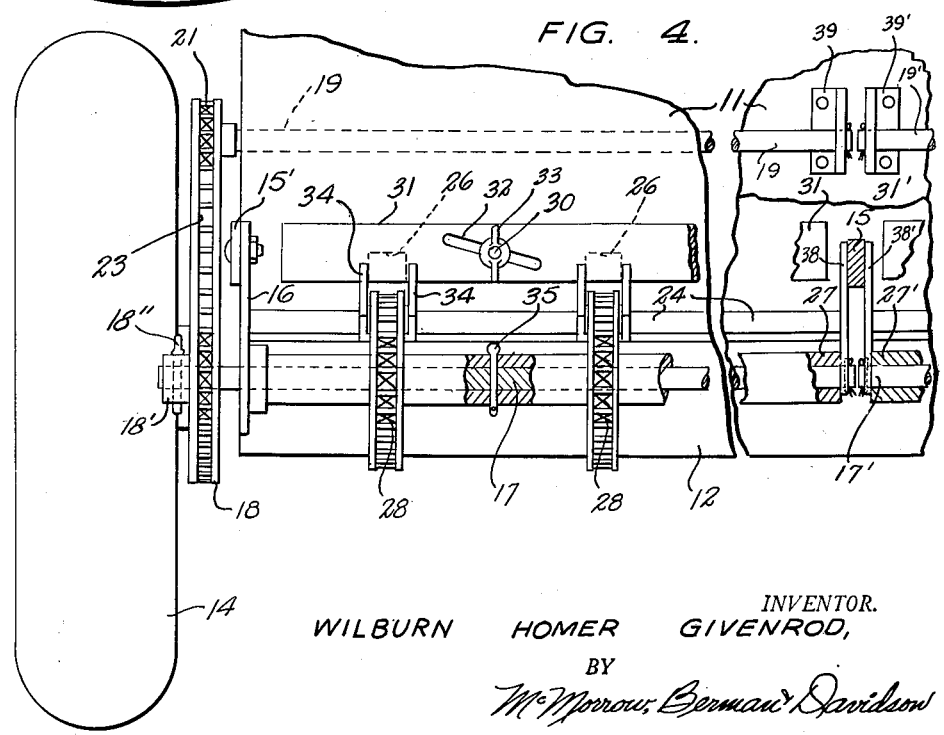
Figure 4 is an enlarged front elevational detail view, partly in cross-section, of one side of the fertilizer spreading device of Figure 1.

The bottom wall of hopper 11 comprises a forwardly extending, downwardly inclined plate member 24 which extends beyond the front wall of the hopper and defines a transverse shelf at the lower end of said front wall. At a plurality of transversely spaced points the rear and front walls of hopper 11 are formed with longitudinally aligned bottom openings, shown respectively at 25 and 26. Rotatably mounted on shafts 17 and 17' are respective sleeve members 27 and 27', terminating at the respective brackets 38 and 38'. Secured to each sleeve member 27 and 27' are a plurality of spaced sprocket wheels 28, said sprocket wheels 28 being respectively each longitudinally aligned with a pair of hopper openings 25 and 26. Passing through each pair of hopper openings around the portion of the stationary roller or cylindrical member 12 intermediate the adjacent pair of guide lugs 37 on the latter and engaging a longitudinally aligned sprocket wheel 28 is a sprocket chain 29, the portion thereof forwardly adjacent opening 26 overlying the shelf 24 and being slidably supported thereon, as shown in Figure 3.

Secured to the lower portion of the front wall of hopper 11 are forwardly projecting studs 30. Designated at 31, 31' are a pair of valve bars, each valve bar being formed with inclined slots 32 receiving the studs 30 each bar being secured in a desired position of vertical adjustment by wing nuts 33 threaded on the studs 30. The valve bars 31, 31' overlap the openings 26 and by vertically adjusting said valve bars the rate of feed of fertilizer from the hopper 11 through the openings 26 may be regulated. The valve bars 31, 31' terminate adjacent the central longitudinal vertical plane of the machine.

Secured to the shelf member 24 forwardly adjacent each aperture 26 and spaced forwardly of the valve bar overlapping said aperture are spaced longitudinal vertical wall elements 34, 34, defining with said shelf member a forwardly directed discharge spout or chute for fertilizer material.

The respective sleeve members 27 and 27' are keyed to the respective shafts 17 and 17' by transverse pins 35 passing through the sleeves and said shafts. The pins 35 may be readily removed, so that either one or both of the sleeve members 27 and 27' may be uncoupled from the respective shafts 17 and 17' if so desired.

As shown in Figure 3, the rear wall of hopper 11 is formed above the apertures 25 with inwardly turned shield elements 36 overlying the chains 29 and preventing leakage of material through apertures 25.

In operation, as the machine is drawn over the area to be fertilized, the rotation of wheels 14, 14 causes chains 23, 23 to rotate shafts 19, 19' and 17, 17'. Rotation of shafts 19, 19' causes the material in the lower portion of the hopper 11 to be agitated and prevents bridging of the material in said hopper lower portion. Rotation of shafts 17, 17' is communicated to the sleeve members 27 and 27' through the pins 35, causing the sprocket wheels 28 to rotate and causing the chains 29 to be drawn through the bottom of the hopper. The chains convey fertilizer from the hopper through the apertures 26, below the valve bars 31 and 31' and through the chutes defined by the parallel plates 34 forwardly adjacent each aperture 26. The fertilizer is thus discharged from the forward edge of shelf member 24 and is distributed evenly on the ground as the machine passes thereover.

As above explained, one side of the machine may be rendered inactive if so desired by removing the pin member 35 at that side and by moving the corresponding valve bar 31 or 31' downwardly to substantially closed position with respect to the apertures 26 associated therewith.

To maintain the chains 29 in proper longitudinal alignment with respect to the apertures 25 and 26, the stationary cylindrical member 12 is provided with spaced guide lugs 37, 37 adjacent each chain 29 and receiving the chain therebetween. Said guide lugs act to prevent transverse movement of the chains as they are drawn around the cylindrical member 12.

While a specific embodiment of a fertilizer spreading machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a material spreading machine comprising a hopper formed with a longitudinally projecting bottom wall, said bottom wall projecting for a substantial distance forwardly of the adjacent hopper wall, a cylindrical member transversely secured to said bottom wall, said cylindrical member being provided with a plurality of spaced guide means arranged in spaced relation therealong, an axle element coaxially positioned adjacent each end of said cylindrical member and secured thereto, ground engaging wheels journaled on the ends of said axle element and rotatable relative thereto, longitudinally extending bracket means in spaced relation forwardly of said hopper and carried by the latter, a transverse shaft journaled in said bracket means, a sleeve member carried on said shaft, means interengaging said sleeve member and said shaft for coupling said sleeve member to said shaft, a drive transmission means connecting said ground engaging wheels to said shaft, a plurality of sprocket wheels transversely spaced along said sleeve member and carried by the latter, sprocket chains engaged on said sprocket wheels and passing through the lower portion of said hopper and around the portions of said cylindrical member intermediate the guide means adjacent thereto, said sprocket chains being in slidable engagement with said cylindrical member, and vertically adjustable transverse gate means carried by one of the hopper transverse walls above and adjacent the sprocket chains and the forwardly projecting bottom wall.

2. A material spreading machine comprising a hopper formed with a forwardly projecting bottom wall defining a front shelf, a cylindrical member transversely secured to said bottom wall, said cylindrical member being provided with a plurality of pairs of guide lugs arranged in spaced relation therealong, an axle element coaxially positioned adjacent to each end of said cylindrical member and secured thereto, ground engaging wheels journaled on the ends of said element and rotatable relative thereto, bracket means positioned forwardly of and spaced from said hopper and dependingly carried by the latter, a transverse shaft journaled in said bracket means, an agitator rotatably mounted in said hopper in substantial superimposed relation with respect to said cylindrical member, a sprocket chain operatively connecting said agitator, said ground engaging wheels and said shaft together, a plurality of sleeve members carried on said shaft, means releasably keying the sleeve members to said shaft, a plurality of sprocket wheels transversely spaced along each sleeve member and carried by the latter, sprocket chains engaged on said sprocket wheels and passing through the lower portion of the hopper in slidable engagement with said shelf, said sprocket chains extending around the portions of said cylindrical member intermediate the pairs of lugs adjacent thereto and in slidable engagement with said portions of said cylindrical member, and vertically adjustable transverse gate members carried by the front transverse wall of the hopper above and adjacent the sprocket chains.

WILBURN HOMER GIVENROD.

REFERENCES CITED

The following references are of record in the file of this patent:

UNITED STATES PATENTS

| Number | Name | Date |
|---|---|---|
| 104,694 | Burnett | June 28, 1870 |
| 977,884 | King | Dec. 6, 1910 |
| 1,894,008 | Segars | Jan. 10, 1933 |

FOREIGN PATENTS

| Number | Country | Date |
|---|---|---|
| 584,625 | France | Nov. 22, 1924 |